(12) United States Patent
Kim

(10) Patent No.: US 8,604,484 B2
(45) Date of Patent: Dec. 10, 2013

(54) DISPLAY DEVICES AND METHODS OF MANUFACTURING THE DISPLAY DEVICES

(75) Inventor: Hyun-Chul Kim, Yongin (KR)

(73) Assignee: Samsung Display Co., Ltd. (KR)

( * ) Notice: Subject to any disclaimer, the term of this patent is extended or adjusted under 35 U.S.C. 154(b) by 145 days.

(21) Appl. No.: 13/208,296

(22) Filed: Aug. 11, 2011

(65) Prior Publication Data

US 2012/0280236 A1    Nov. 8, 2012

(30) Foreign Application Priority Data

May 4, 2011    (KR) .......................... 10-2011-0042220

(51) Int. Cl.
*H01L 27/14*    (2006.01)

(52) U.S. Cl.
USPC ................................ 257/72; 257/56; 257/258

(58) Field of Classification Search
USPC .............................................. 257/59, 72, 258
See application file for complete search history.

(56) References Cited

U.S. PATENT DOCUMENTS

| 6,226,057 B1 * | 5/2001 | Lee .................................. 349/38 |
| 2002/0113926 A1 * | 8/2002 | Hanazawa et al. ............. 349/113 |

FOREIGN PATENT DOCUMENTS

| KR | 1020030058549 | 7/2003 |
| KR | 1020080004898 | 1/2008 |

* cited by examiner

*Primary Examiner* — Tan N Tran
(74) *Attorney, Agent, or Firm* — Knobbe Martens Olson & Bear LLP

(57) ABSTRACT

A display device includes a switching device, a first pixel electrode, a dielectric layer and a second pixel electrode. The switching device is provided on the lower substrate. The organic layer pattern is disposed on the lower substrate. The organic layer pattern includes a plurality of stepped portions in a pixel region. The first pixel electrode is disposed on the organic layer pattern in the pixel region. The dielectric layer is disposed on the first pixel electrode. A plurality of the second pixel electrodes is disposed on the dielectric layer. The second pixel electrodes are partially superimposed over the first pixel electrode. Non-uniform vertical fields may be minimized by the morphology of the first pixel electrode, so that the display device may have excellent brightness and transmittance.

12 Claims, 18 Drawing Sheets

(DISTANCE BETWEEN ELECTRODES : 10μm)

(DISTANCE BETWEEN ELECTRODES : 8μm)

(DISTANCE BETWEEN ELECTRODES : 6μm)

DISPLAY DEVICES AND METHODS OF MANUFACTURING THE DISPLAY DEVICES

CROSS-REFERENCE TO RELATED APPLICATIONS

This application claims priority to Korean patent Application No. 10-2011-0042220, filed on May 4, 2011, the disclosure of which is hereby incorporated by reference herein in its entirety.

BACKGROUND

1. Field

The disclosure relates to display devices and methods of manufacturing display devices. More particularly, embodiments relate to liquid crystal display devices and methods of manufacturing liquid crystal display devices.

2. Description of the Related Technology

A liquid crystal display (LCD) device generally includes a lower substrate, an upper substrate facing the lower substrate, and a liquid crystal layer disposed between the lower and upper substrates.

A plurality of data lines and a plurality of gate lines, which may extend perpendicularly with respect to each other, may be arranged on the lower substrate to define a plurality of pixel regions. A thin film transistor (TFT) may be disposed on a region in which the data line and the gate line cross over each other and a pixel electrode may be disposed in each of the pixel regions.

The conventional liquid crystal display device usually operates in a twisted nematic (TN) mode in which liquid crystal molecules may be arranged in a vertical direction with respect to a lower or upper substrate. Recently, however, a liquid crystal display device using plane to line switching (PLS) mode has been developed in order to obtain a wide-viewing angle.

In the PLS mode, a pixel electrode and a common electrode insulated from each other may be disposed on a lower substrate including TFT transistors. A fringe field may be generated between the pixel electrode and the common electrode, so that liquid crystal molecules may be arranged in a parallel direction to the lower substrate.

In an LCD device operating in the PLS mode, a non-uniform vertical fringe field may be generated in central portions of the pixel and common electrodes. Considering the above-mentioned problem, a thick insulation layer may be disposed between the pixel and common electrodes, or the electrodes may be formed to have a slit pattern shape. However, more fundamental methods to prevent the generation of the vertical fringe field may be needed.

SUMMARY OF CERTAIN INVENTIVE ASPECTS

Certain embodiments provide a display device having improved brightness distribution and light transmittance.

Certain embodiments provide a method of manufacturing a display device having improved brightness distribution and light transmittance.

According to some embodiments, there is provided a display device including a switching device, a first pixel electrode, a dielectric layer and a second pixel electrode. The switching device is provided on the lower substrate. The organic layer pattern is disposed on the lower substrate. The organic layer pattern includes a plurality of stepped portions in a pixel region. The first pixel electrode is disposed on the organic layer pattern in the pixel region. The dielectric layer is disposed on the first pixel electrode. A plurality of the second pixel electrodes is disposed on the dielectric layer. The second pixel electrodes are partially superimposed over the first pixel electrode.

The organic layer pattern may have a substantially wavy structure or a substantially toothed structure in the pixel region.

The organic layer pattern may include a plurality of recesses, grooves or dents in the pixel region.

Each of the recesses, the grooves or the dents may include a rounded sidewall or an inclined sidewall.

The first pixel electrode and the dielectric layer may include a plurality of recesses, grooves or dents, respectively. Each of the second pixel electrodes may be disposed in each of the recesses, the grooves or the dents of the dielectric layer.

Each of the second pixel electrodes may have an upper face lower than an uppermost face of the first pixel electrode.

Each of the second pixel electrodes may include a first sub-electrode and second sub-electrode. The first sub-electrode may be electrically connected to the switching device and the second sub-electrode may be partially superimposed over the first pixel electrode.

The first sub-electrode may make contact with the switching device through a contact hole penetrating the dielectric layer and the organic layer pattern.

The first pixel electrode may be electrically connected to the switching device.

The switching device may include a gate electrode, a gate insulation layer, an active layer, a source electrode and a drain electrode disposed on the lower substrate.

The display device may further include a liquid crystal layer on the second pixel electrodes and an upper substrate on the liquid crystal layer. The upper substrate may face the lower substrate.

The lower substrate may include a data line and the first pixel electrode may be superimposed over the data line.

A horizontal field relative to the lower substrate may be generated between the first pixel electrode and the second pixel electrode adjacent to the first pixel electrode.

According to some embodiments, there is provided a method of manufacturing a display device. In the method, a switching device is formed on a lower substrate. An organic layer pattern is formed on the lower substrate to cover the switching device in a device region. The organic layer pattern may include a plurality of stepped portions in the pixel region. A first pixel electrode is formed on the organic layer pattern in the pixel region. A dielectric layer is formed on the organic layer pattern to cover the first pixel electrode. A plurality of second pixel electrodes is formed on the dielectric layer. The second pixel electrodes may be partially superimposed over the first pixel electrode.

The organic layer pattern may have a substantially wavy structure or a substantially toothed structure in the pixel region.

The organic layer pattern may include a plurality of recesses, grooves or dents. The recesses, the grooves or the dents may have round shapes or inclined sidewalls, respectively.

Each of the second pixel electrodes may be formed in each of the recesses, the grooves or the dents.

For forming the organic layer pattern, an organic layer may be formed on the lower substrate to cover the switching device. An exposure process may be performed on the organic layer using a mask including a transparent region and a semi-transparent region. An exposed portion of the organic layer may be removed.

For forming the organic layer pattern, an organic layer may be formed on the lower substrate to cover the switching device. The organic layer may be partially removed by a dry etching process.

According to some embodiments, the display device may include a pixel electrode having a cross-section profile of a substantially wavy structure or a substantially toothed structure. Due to the geometric shape or morphology of the pixel electrode, a non-uniform vertical field may be cancelled and a horizontal field may be enhanced. Additionally, a parasitic capacitance between the pixel electrode and a data line may be minimized and a viewing angle of the display device may be increased by adjusting the morphology of the pixel electrode.

BRIEF DESCRIPTION OF THE DRAWINGS

Embodiments will be more clearly understood from the following detailed description taken in conjunction with the accompanying drawings.

FIG. 1 is a plan view illustrating an embodiment of a display device;

FIG. 2 is a partially enlarged plan view illustrating a portion "A" in FIG. 1;

FIG. 3 is a cross-sectional view taken along line I-I' in FIG. 2;

FIG. 4 is a cross-sectional view illustrating an embodiment of a display device;

FIG. 5 is a cross-sectional view illustrating an embodiment of a display device;

FIG. 6 is a cross-sectional view illustrating an embodiment of a display device;

FIG. 7 is a cross-sectional view illustrating a fringe field generated in a conventional liquid crystal display device operating in a PLS mode;

FIG. 8 is a partially enlarged cross-sectional view illustrating a portion "C" in FIG. 3;

FIG. 9 is a partially enlarged cross-sectional view illustrating a portion "D" in FIG. 4;

FIGS. 10 to 23 are cross-sectional views illustrating an embodiment of a method of manufacturing a display device;

FIGS. 24 to 31 are cross-sectional views illustrating an embodiment of a method of manufacturing a display device;

FIG. 32 is a graph showing a field generated between a pixel electrode and a common electrode of a conventional liquid crystal display device operating in a PLS mode;

FIGS. 33 to 35 are graphs showing fields generated between first and second electrodes of the embodiments of display devices; and FIG. 36 is a graph showing a light transmittance of each of the embodiments of display devices illustrated in FIGS. 32 to 35.

DETAILED DESCRIPTION OF CERTAIN INVENTIVE EMBODIMENTS

Figure 1:
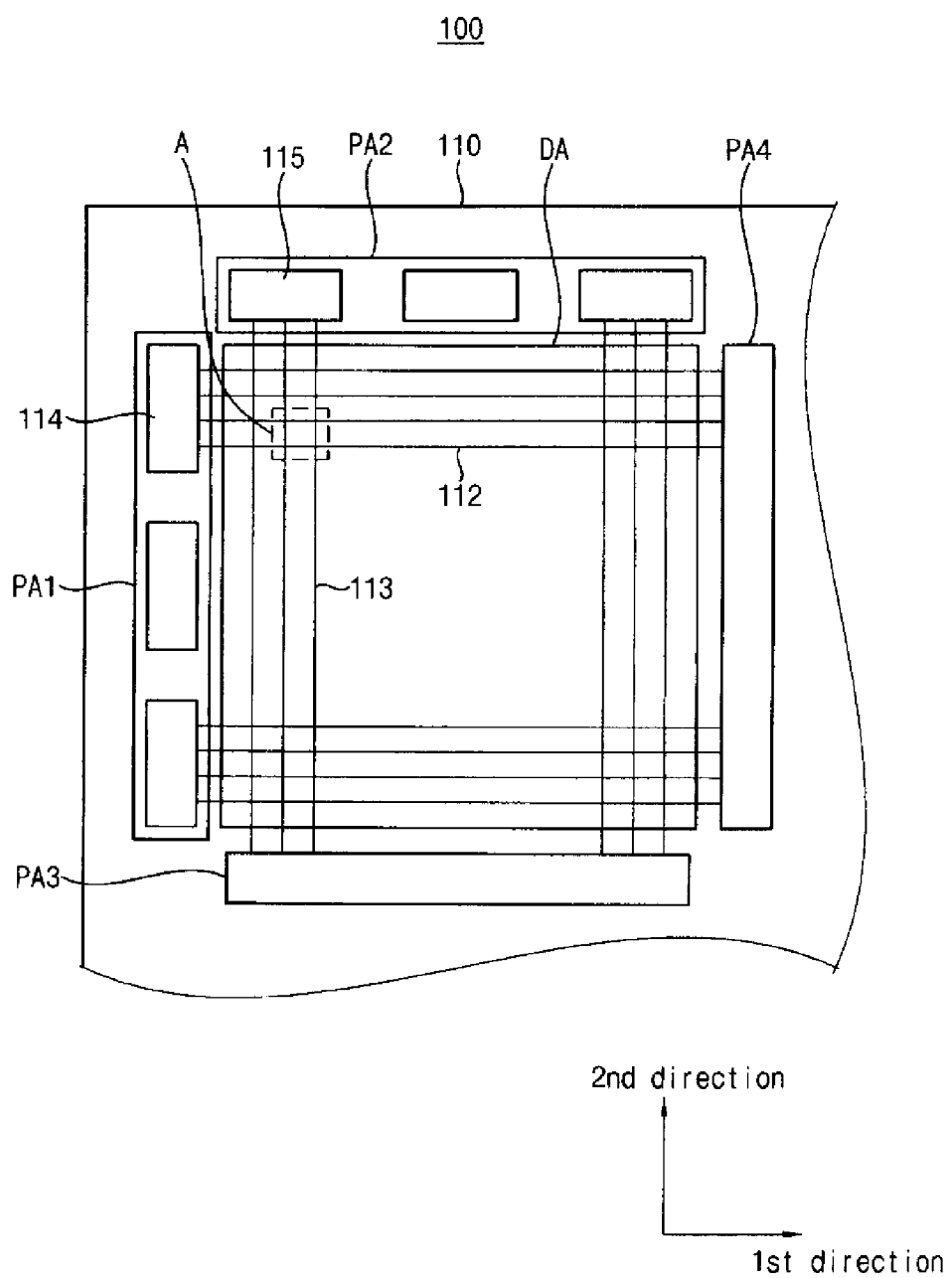
FIGS. 1 to 36 represent certain non-limiting embodiments as described herein.

Various embodiments will be described more fully hereinafter with reference to the accompanying drawings, in which certain embodiments are shown. The invention may, however, be embodied in many different forms and should not be construed as limited to the embodiments set forth herein. Rather, embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected to or coupled to the other element or layer, or intervening elements or layers may be present. In contrast, when an element is referred to as being "directly on," "directly connected to" or "directly coupled to" another element or layer, there are no intervening elements or layers present. Like reference numerals generally refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Certain embodiments are described herein with reference to cross-sectional illustrations that are schematic illustrations of the embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a plan view illustrating an embodiment of a display device.

Referring to FIG. 1, a display device 100 may include a lower substrate 110. The lower 110 may include a display area (DA), a first peripheral area (PA1), a second peripheral area (PA2), a third peripheral area (PA3) and a fourth peripheral area (PA4). The display area (DA) may be disposed at a central portion of the lower substrate 110 and the first to the fourth peripheral areas (PA1, PA2, PA3, PA4) may be disposed in a peripheral region to substantially surround the display area (DA).

In some embodiments, a plurality of gate lines 112 and a plurality of data lines 113 may be disposed in the display area (DA). The gate lines 112 may extend in a first direction on the lower substrate 110 and the data lines 113 may extend along a second direction substantially perpendicular to the first direction. The data lines 113 may be arranged along a direction substantially perpendicular to that of the gate lines 112.

A plurality of gate pads 114 may be disposed in the first peripheral area (PA1). The gate pads 114 may be connected to end portions of the gate lines 112. The gate pads 114 may provide the gate lines 112 with gate signals. A plurality of data pads 115 may be disposed in the second peripheral area (PA2). The data pads 115 may be connected to end portions of the data lines 113 so that display signals may be provided to the data lines 113 through the data pads 115.

The data lines 113 and the gate lines 112 may be substantially crossed over one another in the display area (DA) such that a plurality of pixels of the display device 100 may be defined by the gate lines 112 and the data lines 113. In FIG. 1, a portion "A" indicates one of the pixels of the display device 100.

Figure 2:
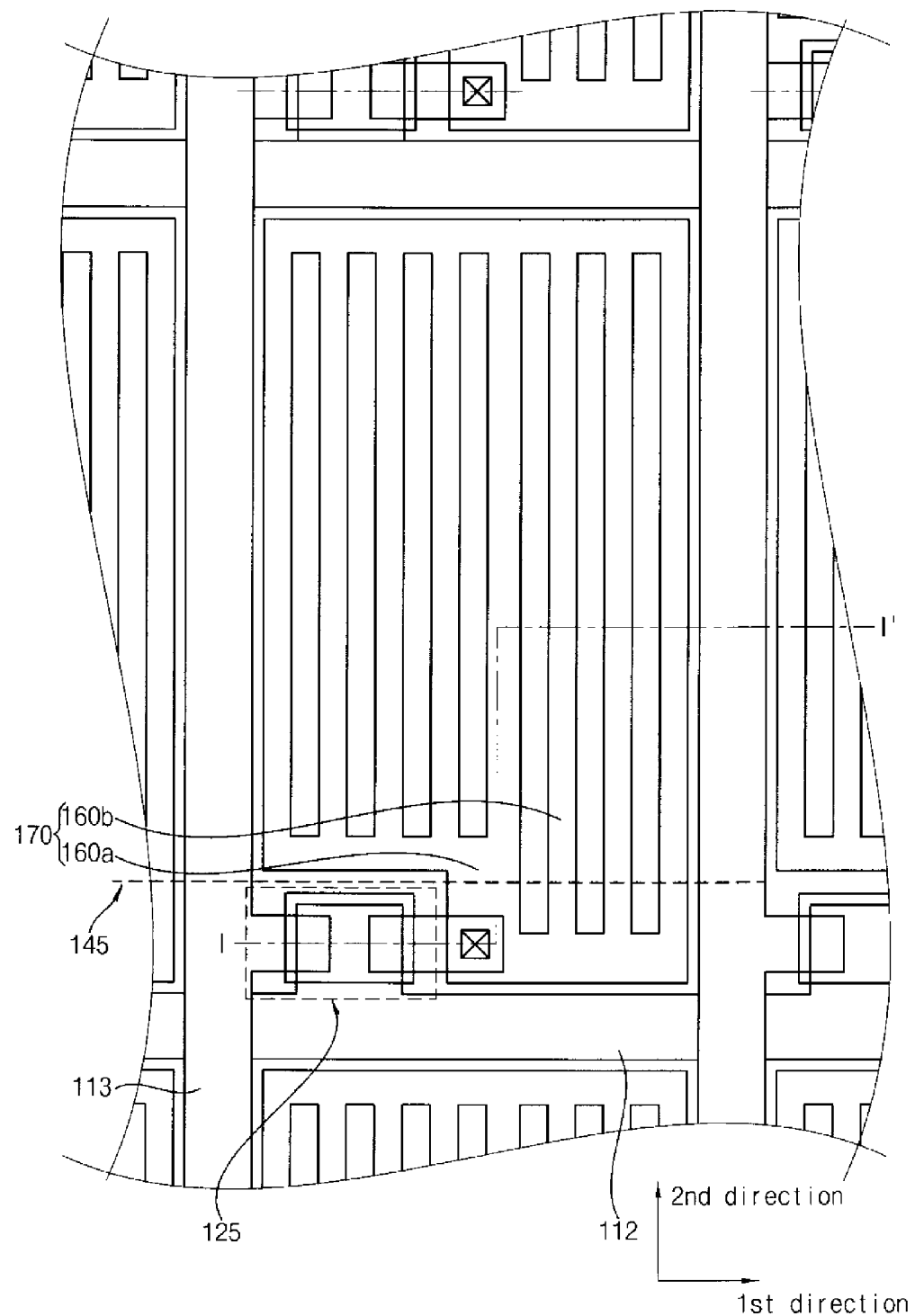

FIG. 2 is a partially enlarged plan view illustrating the portion "A" in FIG. 1.

Referring to FIG. 2, a switching device 125 may be disposed adjacent to a region in which each of the data lines 113 and the gate lines 112 cross over each other. A first pixel electrode 145 and a second pixel electrode 170 for generating a fringe field may be disposed in each of the pixels. The second pixel electrode 170 may include a first sub-electrode 160a and a second sub-electrode 160b. The second sub-electrode 160b may have a slit structure or a grid structure. In some embodiments, the display device 100 may include a plurality of the second sub-electrodes 160b having line shapes or bar shapes that may be spaced apart from each other by a predetermined distance.

Hereinafter, a region in which the switching device 125 may be located is referred to as a device region and another region except for the device region of the pixel is referred to as a pixel region.

Figure 3:
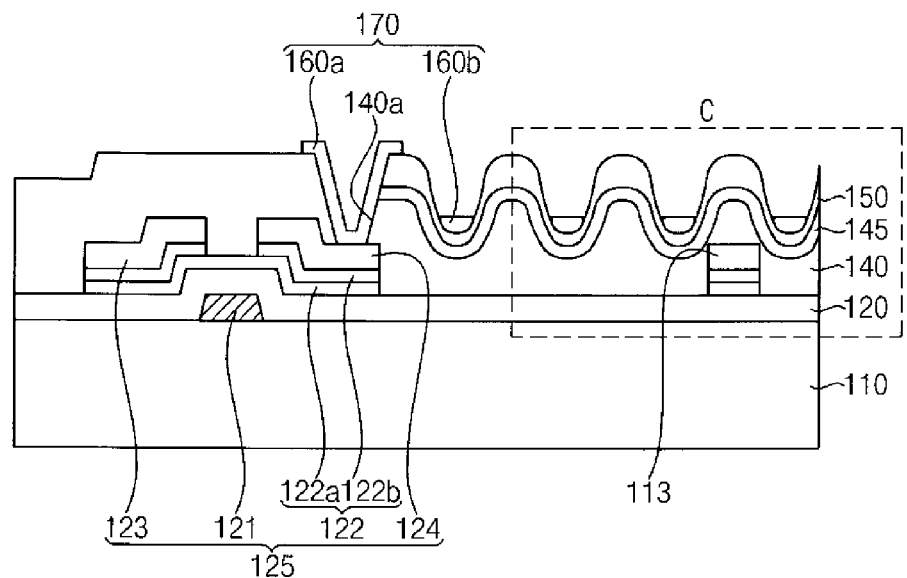

FIG. 3 is a cross-sectional view taken along line I-I' in FIG. 2. In some embodiments, the display device may include a Middle-Com PLS structure in which the first pixel electrode 145 may serve as a common electrode in the display device.

Referring to FIGS. 1 and 3, the display device 100 may include the lower substrate 110, the switching device 125 disposed on the lower substrate 110, the first pixel electrode 145, and the second pixel electrode 170. Additionally, the display device 100 may include the gate line 112 and the data line 113 which may cross over each other to define the pixel region. The gate line 112 may extend on the lower substrate 110 in a first direction and the data line 113 may extend on the lower substrate 110 along a second direction substantially perpendicular to the first direction.

The switching device 125 may include a gate electrode 121, a gate insulation layer 120, an active layer 122, a source electrode 123 and a drain electrode 124, which may be sequentially disposed on the lower substrate 110.

The gate electrode 121 may be connected to the gate line 112. In some embodiments, the gate electrode 121 may be divided from the gate line 112 having a line or bar shape. The gate electrode 121 may include a metal, alloy, or the like. In some embodiments, the gate electrode 121 may include chromium (Cr), aluminum (Al), tantalum (Ta), molybdenum (Mo), titanium (Ti), tungsten (W), copper (Cu), silver (Ag), alloys of these metals, and the like. These metals and/or alloys may be used alone or in a combination thereof.

A gate insulation layer 120 may be disposed on the lower substrate 110 to cover the gate line 112 and the gate electrode 121. The gate insulation layer 120 may include a silicon compound. In some embodiments, the gate insulation layer 120 may include silicon oxide (SiOx), silicon nitride (SiNx), silicon oxynitride (SiOxNy), or the like. In various embodiments, the gate insulation layer 120 may have a single-layered structure, or a multi-layered structure.

An active layer 122 may be positioned on the gate insulation layer 120. In some embodiments, the active layer 122 may have a multi-layered structure including a semiconductor layer 122a and an ohmic contact layer 122b. The semiconductor layer 122a may include amorphous silicon (a-Si), and the ohmic contact layer 122b may include amorphous silicon doped with N type impurities. In some embodiments, the ohmic contact layer 122b may have a relatively high impurity concentration such as an n+ type. In other embodiments, the active layer 122 may have a single-layered structure including silicon doped with impurities.

In some embodiments, the active layer 122 may have a thin layer structure including low temperature polysilicon (LTPS). An LTPS thin layer has good electron mobility so that the LTPS thin layer may be highly integrated. Thus, the LTPS thin layer may be advantageously employed in a display device having minute pixels. In embodiments where the active layer 122 includes an LTPS thin layer, the active layer 122 may be obtained by crystallizing an amorphous silicon layer after depositing the amorphous silicon layer on the gate insulation layer 120. In some embodiments, the amorphous silicon layer may be crystallized by a laser annealing process.

The active layer 122 that includes the semiconductor layer 122a of amorphous silicon and the ohmic contact layer 122b of amorphous silicon doped with N type impurities by the relatively high impurity concentration is described further below.

A source electrode 123 and a drain electrode 124 may be disposed on the active layer 122. The source electrode 123 may be connected to the data line 113. The source electrode 123 may divided from the data line 113 having a line shape or a bar shape. The drain electrode 124 may be spaced apart from the source electrode 123 along the first direction. In some embodiments, each of the source and the drain electrodes 123 and 124 may include metal, alloy, or the like. The source and the drain electrodes 123 and 124 may include chrome, aluminum, tantalum, molybdenum, titanium, tungsten, copper, silver, alloys of these metals, and the like. These metals and/or alloys may be used alone or in a combination thereof.

An organic layer pattern 140 may be disposed on the lower substrate 110 to cover the gate insulation layer 120, a portion of the switching device 125 and the data line 113. The organic layer pattern 140 may include stepped portions in the pixel region. In some embodiments, a portion of the organic layer pattern 140 including the stepped portions in the pixel region may have a substantially wavy shape similar to the curving shape of a wave or plurality of waves, as illustrated in FIG. 3. For example, the organic layer pattern 140 in the pixel region may include a plurality of rounded recesses, rounded grooves, and/or rounded dents. The organic layer pattern 140 may be formed by, for example, an embossing process. The organic layer pattern 140 may include a transparent insulating material. The organic layer pattern 140 may include an acryl based resin, a polyimide based resin, benzocyclobutene (BCB), or the like. The organic layer pattern 140 may define a contact hole 140a that partially exposes the drain electrode 124 in the device region. In some embodiments, the contact hole 140a may have a sidewall substantially vertical to the lower substrate 110 or substantially inclined by a predetermined angle relative to an upper face of the lower substrate 110.

Referring now to FIGS. 1 and 3, the first pixel electrode 145 may be disposed on the organic layer pattern 140 in the pixel region of the display device 100. In some embodiments, the first pixel electrode 145 may have a wavy shape substantially the same as or similar to that of the organic layer pattern 140. The first pixel electrode 145 may be formed along a profile of the organic layer pattern 140. The first pixel electrode 145 may also have a structure including a plurality of rounded recesses, rounded grooves or rounded dents. The first pixel electrode 145 may include a transparent conductive material. The first pixel electrode 145 may include indium tin oxide (ITO), indium zinc oxide (IZO), zinc tin oxide (IZO), indium oxide (InOx), tin oxide (SnOx), zinc oxide (ZnOx), and the like. In some embodiments, the first pixel electrode 145 may have a single-layered structure of the transparent conductive material or a multi-layered structure including transparent conductive material films.

A dielectric layer 150 may be disposed on the organic layer pattern 140 to cover the first pixel electrode 145 in the pixel region. The dielectric layer 150 may be conformally formed along a profile of the first pixel electrode 145 in the pixel region, and thus the dielectric layer 150 may also have a substantially wavy shape caused by the stepped portions of the organic layer pattern 140. The dielectric layer 150 may include a plurality of rounded recesses, rounded grooves or rounded dents. The dielectric layer 150 may include a transparent insulating material. In some embodiments, the dielectric layer 150 may include transparent resin, transparent plastic, and the like.

The second pixel electrode 170 may be located on an inside section of the contact hole 140a, and on the dielectric layer 150. The second pixel electrode 170 may have the first sub-electrode 160a and the second sub-electrode 160b. The first sub-electrode 160a may be provided on the inside of the contact hole 140a, so that the first sub-electrode 160a may be electrically connected to the drain electrode 124. The second sub-electrode 160b may be disposed in the pixel region and may be superimposed over a portion of the first pixel electrode 145.

In some embodiments, the second pixel electrode 170 may have a plurality of the second sub-electrodes 160b. Each of the second sub-electrodes 160b may be disposed on a trough or a concave portion of the dielectric layer 150 having the substantially wavy shape. The second sub-electrodes 160b may respectively be located in the rounded recesses, the rounded grooves or the rounded dents. The second sub-electrodes 160b may extend on the dielectric layer 150 along the second direction in a slit structure or a grid structure. Each of the second pixel electrodes 170 may include a transparent conductive material. Each second pixel electrode 170 may include indium tin oxide, indium zinc oxide, zinc tin oxide, indium oxide, tin oxide, zinc oxide, or the like. Each second pixel electrode 170 may have a single-layered structure of the transparent conductive material, or a multi-layered structure including transparent conductive material films.

In some embodiments, as illustrated in FIG. 3, an upper face of each second sub-electrode 160b may be substantially lower than an uppermost face of the first pixel electrode 145.

Although not illustrated, the display device 100 according to some embodiments may include liquid crystal molecules disposed on the second pixel electrode 170 and the organic layer pattern 140, and an upper substrate located on the first and the second electrodes 145 and 170. Additionally, color filters for filtering predetermined color lights may be disposed on an upper face of the upper substrate or a bottom face of the upper substrate.

Figure 4:
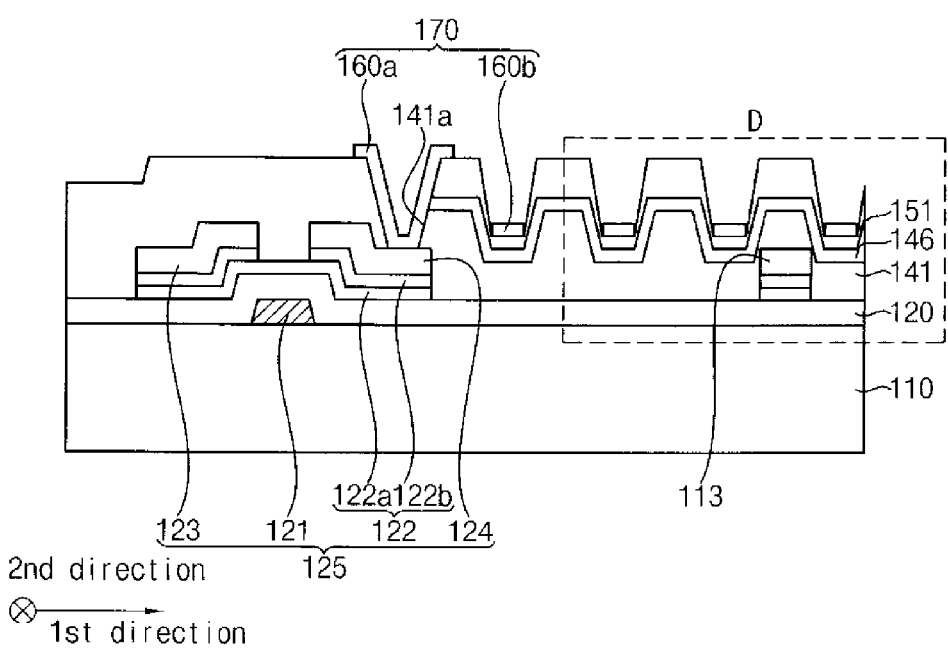

FIG. 4 is a cross-sectional view illustrating an embodiment of a display device.

Referring to FIGS. 1 and 4, an organic layer pattern 141 disposed on the lower substrate 110 may include stepped portions having substantially flattened-off projecting points, or at least partially-squared-off wavy shape, such that they have a substantially toothed shape in the pixel region of the display device 100. The organic layer pattern 141 disposed in the pixel region may include a plurality of recesses, grooves or dents, which have sidewalls inclined by predetermined angles with respect to the lower substrate 110. Accordingly, each of a first pixel electrode 146 and a dielectric layer 151 may also have a substantially toothed shape including recesses, grooves or dents which have inclined sidewalls relative to the lower substrate 110. The organic layer pattern 141 in the device region may define a contact hole 141a partially exposing the drain electrode 124.

In some embodiments, as illustrated in FIG. 4, an upper face of the second sub-electrode 160b of the second pixel electrode 170 may be substantially lower than an uppermost face of the first pixel electrode 146.

Figure 5:
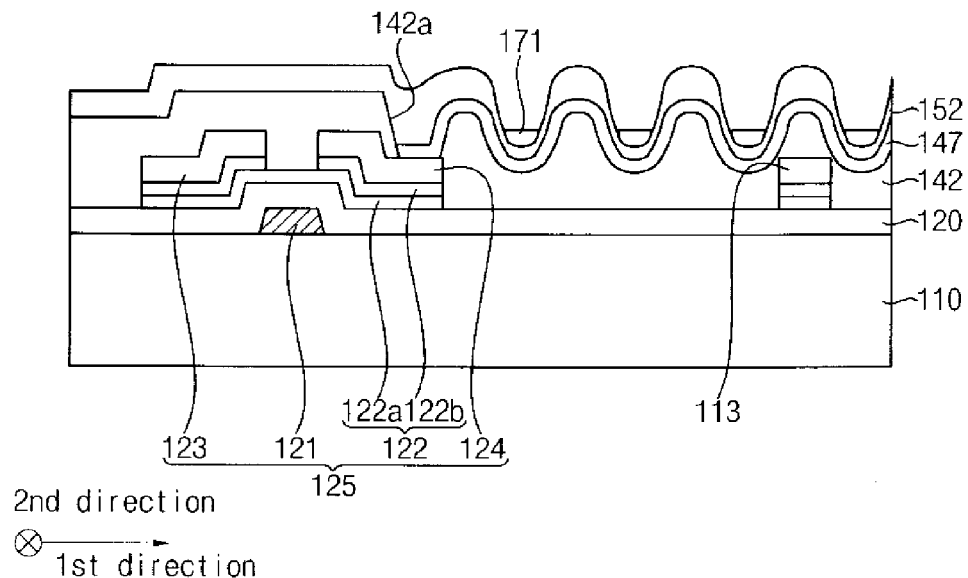

FIG. 5 is a cross-sectional view illustrating an embodiment of a display device. In some embodiments, the display device of FIG. 5 may have a structure of a Top-Com PLS in which a second pixel electrode 171 may serve as a common electrode of the display device.

Referring to FIGS. 1 and 5, an organic layer pattern 142 in the pixel region may have a substantially wavy structure including substantially rounded recesses, substantially rounded grooves or substantially rounded dents. The organic layer pattern 142 may define a contact hole 142a partially exposing the drain electrode 124 in the device region.

A first pixel electrode 147 may be disposed on the organic layer pattern 142 in the pixel region and on a bottom of the contact hole 142a in the device region. The first pixel electrode 147 may make contact with the drain electrode 124. A dielectric layer 152 may be located on the organic layer pattern 142 to cover the first pixel electrode 147. Each of the first pixel electrode 147 and the dielectric layer 152 may be formed along a profile of the organic layer pattern 142 in the pixel region, thereby to have a substantially wavy shape caused by the stepped portions of the organic layer pattern 142.

A second pixel electrode 171 may be disposed on a trough portion or a concave portion of the dielectric layer 152 having the substantially wavy shape in the pixel region. In some embodiments, an upper face of the second pixel electrode 171 may be substantially lower than an uppermost face of the first pixel electrode 147.

Figure 6:
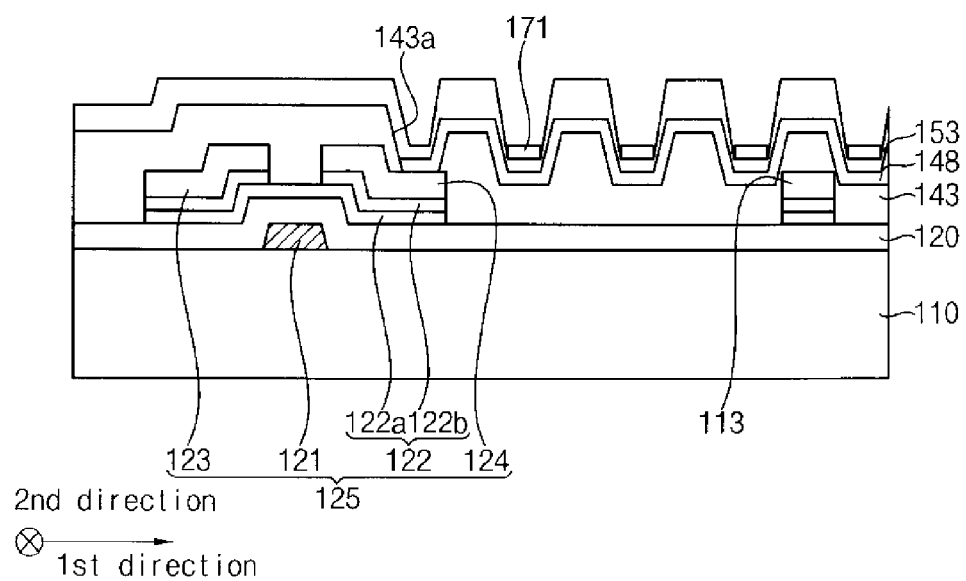

FIG. 6 is a cross-sectional view illustrating an embodiment of a display device.

Referring to FIGS. 1 and 6, an organic layer pattern 143 may have a substantially toothed shape in the pixel region. The organic layer pattern 143 in the pixel region may include a plurality of recesses, grooves or dents which have sidewalls inclined by predetermined angles with respect to the lower substrate 110. The organic layer pattern 143 in the device region may define a contact hole 143*a* partially exposing the drain electrode 124.

A first pixel electrode 148 may be positioned on the organic layer pattern 143 in the pixel region and on a bottom of the contact hole 143*a* in the device region. The first pixel electrode may make contact with the drain electrode 124. A dielectric layer 153 may be disposed on the organic layer pattern 143 to cover the first pixel electrode 148. Each of the first pixel electrode 148 and the dielectric layer 153 may be formed along a profile of the organic layer pattern 143 in the pixel region, and have a substantially toothed shape caused by the stepped portions of the organic layer pattern 143. In some embodiments, an upper face of a second pixel electrode 171 may be substantially lower than an uppermost face of the first pixel electrode 148.

Figure 7:
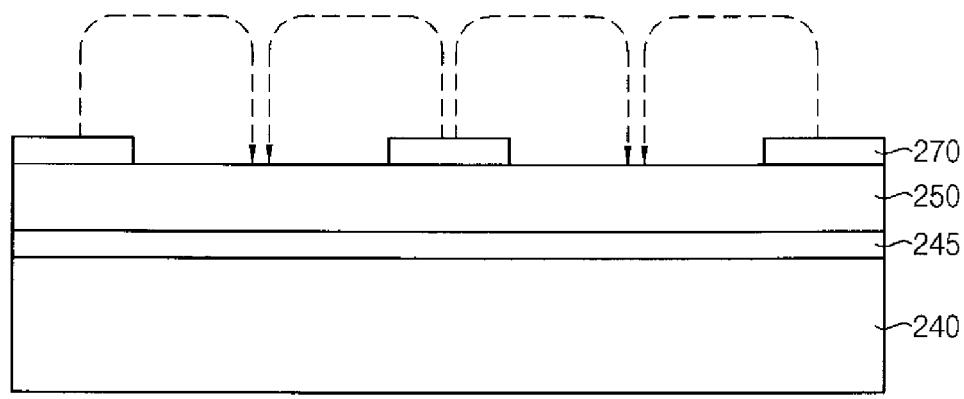
Figure 8:
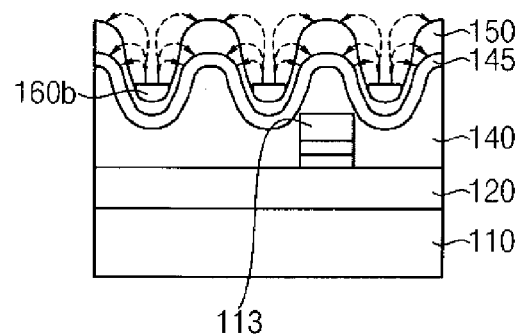
Figure 9:
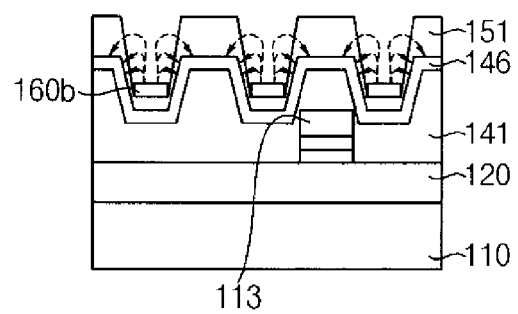

FIG. 7 is a cross-sectional view illustrating a fringe field generated in a conventional LCD device operating in a PLS mode. FIGS. 8 and 9 are partially enlarged cross-sectional views illustrating portions "C" and "D" in FIGS. 3 and 4, respectively.

Referring to FIG. 7, in a conventional LCD device operating in the PLS mode, a first pixel electrode 245 and a dielectric layer 250 may be sequentially provided on an organic layer 240 having a planar surface. A second pixel electrode 270 having a slit-patterned structure may be disposed on the dielectric layer 250. As shown in FIG. 7, the fringe field may be generated between the first and the second pixel electrodes 245 and 270. However, as illustrated by dashed lines, a vertical fringe field may be concentrated non-uniformly between adjacent patterns of the second pixel electrode 270. Due to the non-uniform concentration of the vertical fringe field, an orientation of liquid crystal molecules (not shown) disposed on the second pixel electrode 270 may not be easily controlled to ensure that a brightness distribution throughout an image of the display device is increased.

Referring to FIGS. 8 and 9, in embodiments of the display device, the organic layer patterns 140 and 141, the first and the second pixel electrodes 145 and 146, and the dielectric layers 150 and 151 may have substantially wavy shapes or substantially toothed shapes including recesses, grooves or dents. The second sub-electrodes 160*b* of the second pixel electrode 170 may be positioned on troughs (i.e. recesses, grooves or dents) of the dielectric layers 150 and 151. Due to morphologies or geometric shapes of the first pixel electrodes 145 and 146 partially overlapping the second sub-electrodes 160*b*, a partially horizontal field relative to the lower substrate 110 may be generated between the second sub-electrodes 160*b*, so that a non-uniform vertical field may be cancelled by the partially horizontal field.

As illustrated in FIGS. 8 and 9, according to some embodiments, the upper faces of the second sub-electrodes 160*b* may be substantially lower than the uppermost faces of the first pixel electrodes 145 and 146. In such embodiments, the display device may be operated in a PLS mode in combination with an in plane switch (IPS) mode in which pixel and common electrodes are disposed substantially in parallel with respect to a lower substrate.

According to some embodiments, the first pixel electrodes 145 and 146 may be overlapped with lateral portions of the second sub-electrode 160*b* so that the horizontal field between the first pixel electrodes 145 and 146 and the second sub-electrode 160*b* may be more enhanced. Thus, the non-uniform vertical field generated between the first pixel electrodes 145 and 146 and the second sub-electrode 160*b* may be more reduced. Therefore, a texture or an orientation of liquid crystal molecules may be more easily controlled to prevent an afterimage of the display device. Further, inclination angles of the recesses, the grooves or the dents provided in the organic layer pattern 140 and 141 may be adjusted, so that the organic layer patterns 140 and 141 may function as lenses. In such embodiments, diffraction characteristics or refraction characteristics of the liquid crystal molecules may be adjusted by the organic layer patterns 140 and 141 to obtain a desired view angle and/or a color sense of the display device.

According to some embodiments, a distance between the data line 113 and the first pixel electrodes 145 and 146 and/or between the data line 113 and the second sub-electrode 160*b* may be controlled by adjusting depths or heights of the stepped portions of the organic layer patterns 140 and 141. Accordingly, a parasitic capacitance between the data line 113 and the first pixel electrodes 145 and 146 and/or between the data line 113 and the second pixel electrode 170 may be minimized, thereby reducing a voltage applied to the second pixel electrode 170 and to reduce a power consumption of the display device.

Referring to FIGS. 8 and 9, the first pixel electrodes 145 and 146 may also be disposed over the data line 113. The first pixel electrodes 145 and 146 may extend to peripheral portions of the pixel region, such that an aperture ratio and a transmittance ratio of the display device may be improved.

FIGS. 10 to 23 are cross-sectional views illustrating an embodiment of a method of manufacturing a display device.

Figure 10:
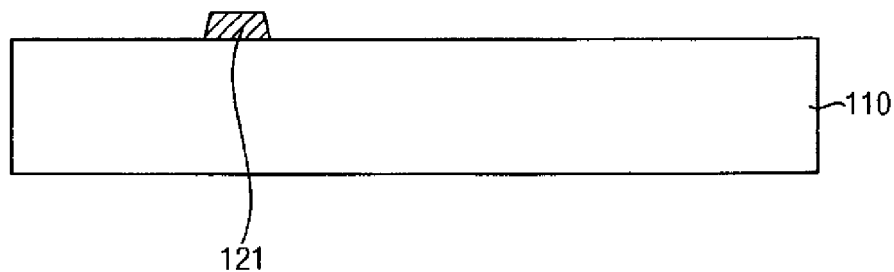

Referring to FIG. 10, a gate electrode 121 and a gate line (not illustrated) may be formed on a lower substrate 110. The lower substrate 110 may include a transparent insulating material. In some embodiments, the lower substrate 110 may include a glass substrate, a quartz substrate, a transparent plastic substrate, a transparent ceramic substrate, or the like. A first conductive layer (not illustrated) may be formed on the lower substrate 110, and the first conductive layer may be patterned by an etching process to form the gate electrode 121 and the gate line on the lower substrate 110. The first conductive layer may be formed using chrome, aluminum, tantalum, molybdenum, titanium, tungsten, copper, silver, alloys of these metals, and the like. The first conductive layer may be obtained by a sputtering process, a chemical vapor deposition (CVD) process, a printing process, or the like. The first conductive layer may have a multi-layered structure including at least two kinds of conductive materials.

Figure 11:
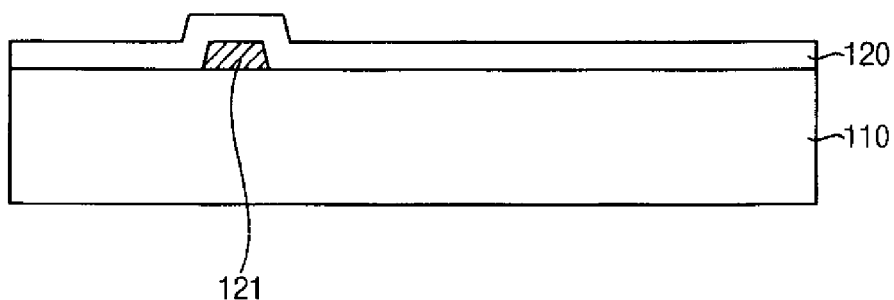

Referring to FIG. 11, a gate insulation layer 120 may be formed on the lower substrate 110 to cover the gate electrode 121 and the gate line. For example, the gate insulation layer 120 may be formed using silicon oxide, silicon nitride, silicon oxynitride, and the like. The gate insulation layer 120 may be obtained by a CVD process, a plasma enhanced chemical vapor deposition (PECVD) process, a spin coating process, and the like. The gate insulation layer 120 may have a multi-layered structure that includes different films of different insulating materials, respectively.

Figure 12:
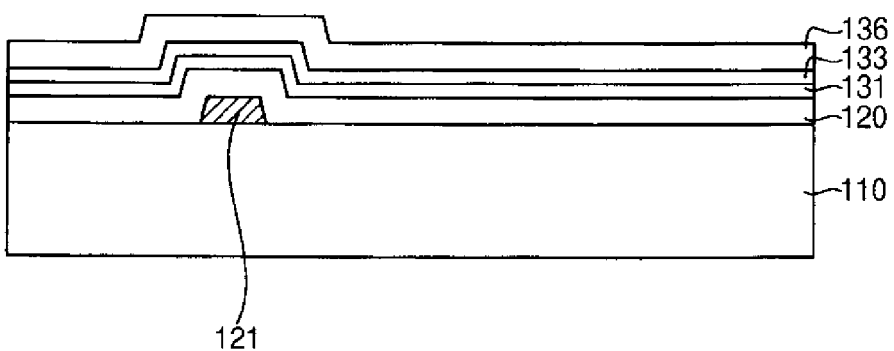

Referring to FIG. 12, an amorphous silicon layer 131, a doped amorphous silicon layer 133 and a second conductive layer 136 may be sequentially formed on the gate insulation layer 120. In some embodiments, the doped amorphous silicon layer 133 may include N type impurities with a relatively high impurity concentration. In various embodiments, each of the amorphous silicon layer 131 and the doped amorphous silicon layer 133 may be formed by a CVD process, a PECVD process, and the like. The second conductive layer 136 may be formed using chrome, aluminum, tantalum, molybdenum, titanium, tungsten, copper, silver, or alloys of these metals. The second conductive layer 136 may be obtained by a sputtering process, a CVD process, a printing process, and the like. The second conductive layer 136 may also have a multi-layered structure including at least two kinds of conductive materials.

Figure 13:
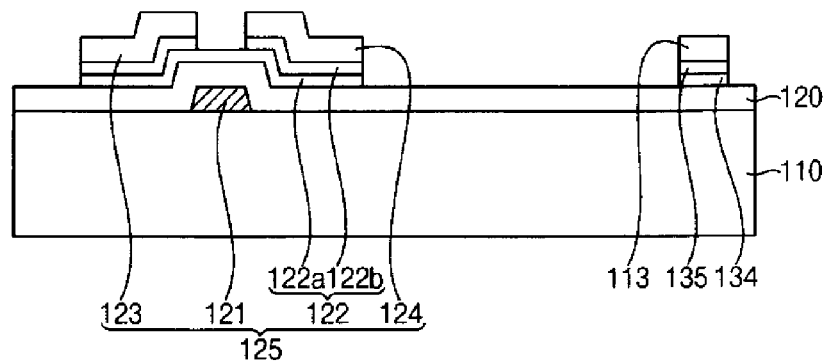

Referring to FIG. 13, the second conductive layer 136, the doped amorphous silicon layer 133 and the amorphous silicon layer 131 may be etched to form an active layer 122, a source electrode 123, a drain electrode 124 and a data line 113 on the gate insulation layer 120. In some embodiments, the second conductive layer 136 may be etched to form the source electrode 123, the drain electrode 124 and the data line 113, and the amorphous silicon layer 131 and the doped amorphous silicon layer 133 may be partially etched to form the active layer 122 in the device region and to form first and second patterns 134 and 135 in the pixel region. The active layer 122 may include a semiconductor layer 122a containing amorphous silicon and an ohmic contact layer 122b containing doped amorphous silicon. The first and the second patterns 134 and 135 may be formed between the data line 113 and the lower substrate 110 in the pixel region.

In some embodiments, the second conductive layer 136, the doped amorphous silicon layer 133 and the amorphous silicon layer 131 may be sequentially etched through at least two etching processes. In other embodiments, the second conductive layer 136, the doped amorphous silicon layer 133 and the amorphous silicon layer 131 may be etched simultaneously using a halftone mask by one etching process.

After the above-described processes, a switching device 125 including the gate electrode 121, the active layer 122, the source electrode 123 and the drain electrode 124 may be provided in the device region in which the data line 113 and the gate line may cross over each other.

In some embodiments, the active layer 122 may include an LTPS thin layer. The LTPS thin layer may be obtained by crystallizing an amorphous silicon layer by, for example, a laser annealing process.

Figure 14:
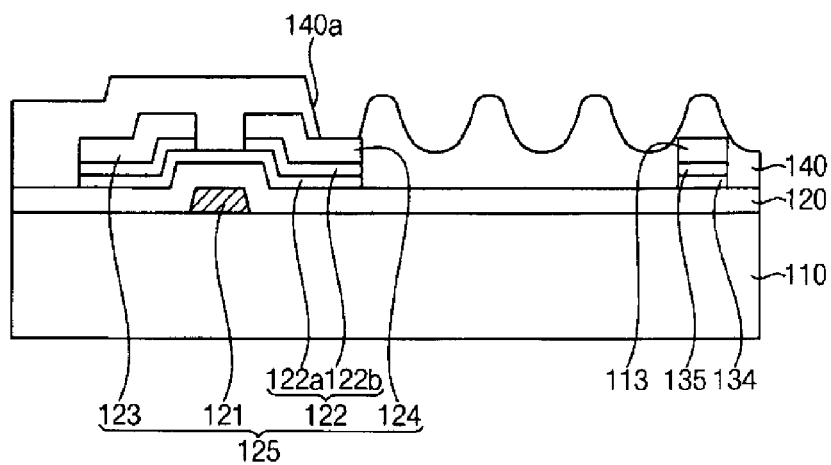

Referring to FIG. 14, an organic layer pattern 140 may be formed on the gate insulation layer 120 to cover the data line 113 and a portion of the switching device 125. In some embodiments, an organic layer (not illustrated) may be formed on the lower substrate 110 to entirely cover the resultant structure on the lower substrate 110. The organic layer may be formed using a transparent insulating material such as acryl based resin, polyimide based resin, BCB, and the like. The organic layer may be obtained by a spin coating process, a slit coating process, and the like. An embossing process may be performed about a portion of the organic layer which is positioned in the pixel region, so that the organic layer pattern 140 may be formed in the pixel region. In some embodiments, a halftone mask (not illustrated) or a halftone slit mask (not illustrated) including a blocking region, a semi-transparent region and a transparent region may be located over the organic layer, and an exposure process may be performed about the organic layer using the halftone mask or the halftone slit mask. An exposed portion of the organic layer may be removed using a developing solution to thereby obtain the organic layer pattern 140.

A contact hole 140a may be formed through the organic layer in the device region simultaneously with the organic layer pattern 140. The contact hole 140a may partially expose the drain electrode 124. The contact hole 140a may have a sidewall substantially perpendicular to the lower substrate 110 or a sidewall inclined by a predetermined angle with respect to the lower substrate 110.

In some embodiments, the organic layer pattern 140 may have a substantially wavy shape in the pixel region as illustrated in FIG. 14. A portion of the organic layer pattern 140 positioned in the pixel region may include a plurality of substantially rounded recesses, substantially rounded grooves or substantially rounded dents.

Figure 15:
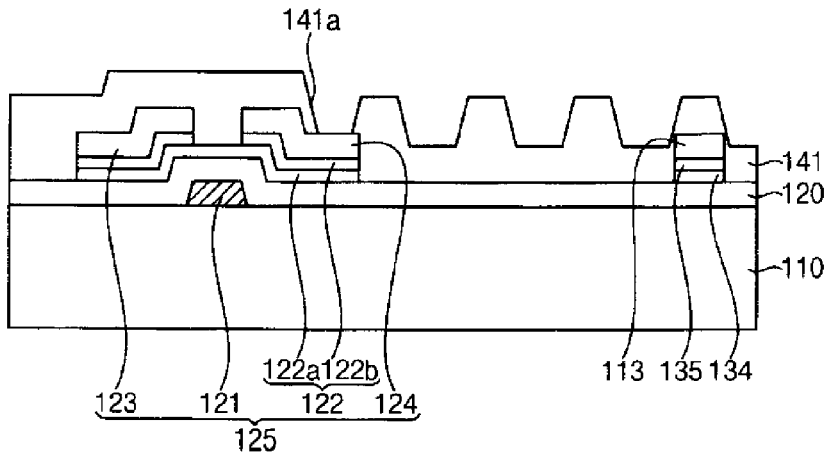

In some embodiments, an organic layer pattern 141 may have a substantially toothed shape as illustrated in FIG. 15. A portion of the organic layer pattern 141 located in the pixel region may include a plurality of recesses, grooves or dents which have substantially inclined sidewalls. A portion of the organic layer formed in the pixel region may be partially etched by a dry etching process to obtain the organic layer pattern 141 including the recesses, the grooves or the dents which have the inclined sidewalls. Simultaneously, a portion of the organic layer in the device region may also be partially etched to form a contact hole 141a that exposes a portion of the drain electrode 124. The contact hole 141a may have a sidewall substantially vertical to the lower substrate 110 or a sidewall inclined by a predetermined angle relative to the lower substrate 110.

Figure 16:
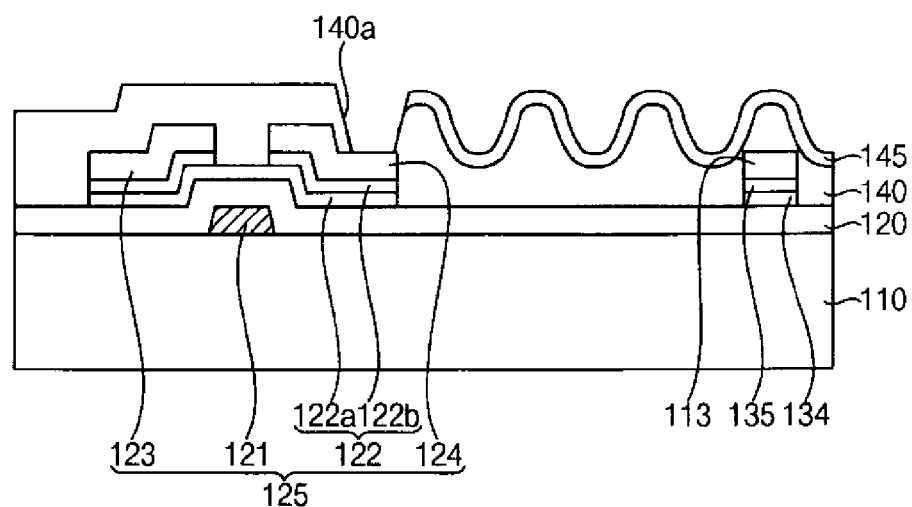

Referring to FIG. 16, a first transparent electrode layer (not illustrated) may be formed on the organic layer pattern 140. A portion of the first transparent electrode layer located in the device region may be removed to form a first pixel electrode 145 on the organic layer pattern 140. The first transparent electrode layer may be formed using a transparent conductive material such as indium tin oxide, indium zinc oxide, zinc oxide, zinc tin oxide, tin oxide, indium oxide, and the like. The first transparent electrode layer may be obtained by a sputtering process, a CVD process, a printing process, or the like.

In some embodiments, the first pixel electrode 145 may have a structure substantially the same as or substantially similar to that of the organic layer pattern 140. The first pixel electrode 145 may also have a substantially wavy shape having substantially rounded recesses, substantially rounded grooves or substantially rounded dents.

Figure 17:
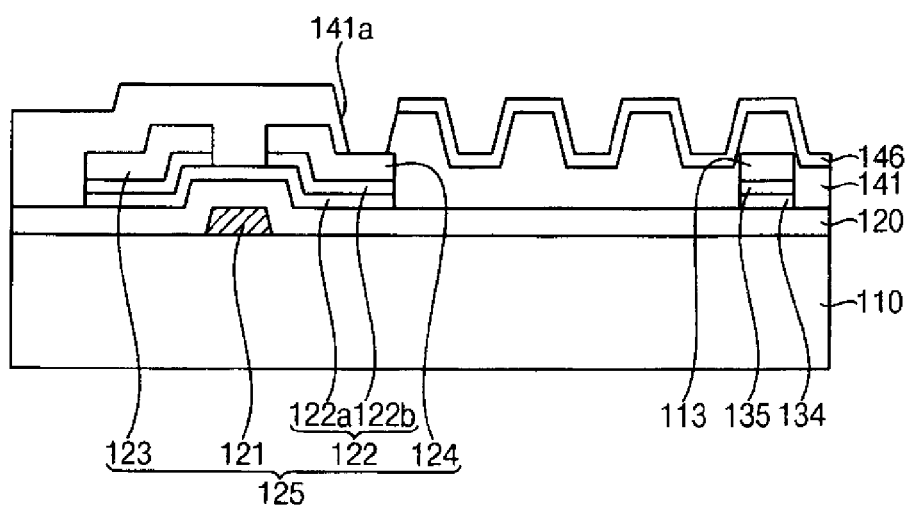

In other embodiments, as illustrated in FIG. 17, a first pixel electrode 146 may have a substantially toothed shape when the organic layer pattern 141 has a substantially toothed shape. For example, the first pixel electrode 146 may include recesses, grooves or dents which have inclined sidewalls.

According to various embodiments, the first pixel electrodes 145 and 146 may be partially or entirely superimposed over the data line 113. Accordingly, the display device including either of the first pixel electrodes 145 and 146 may ensure an improved aperture ratio and an enhanced transmittance ratio.

Figure 18:
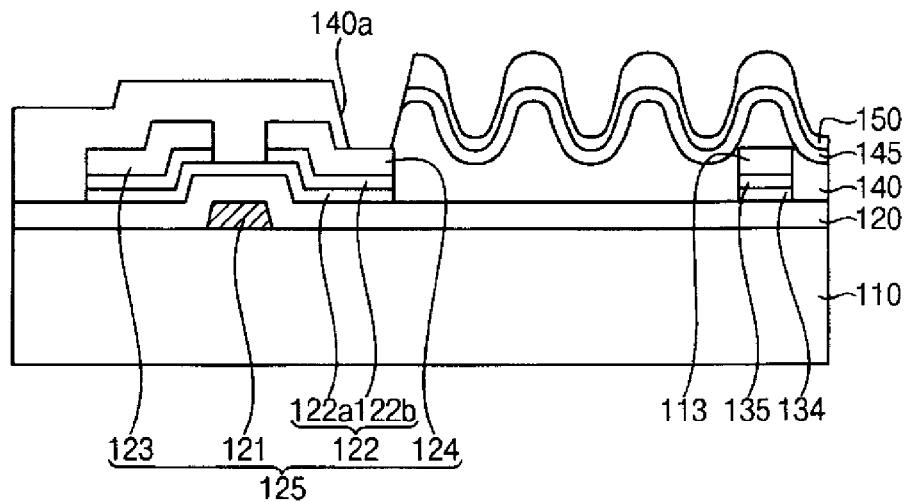

Referring to FIG. 18, a dielectric layer 150 may be formed on the first pixel electrode 145. The dielectric layer 150 may be formed using a transparent insulating material by a CVD process, a PECVD process, or the like. The dielectric layer 150 may be conformally formed along a profile of the first pixel electrode 145. Thus, the dielectric layer 150 may have a substantially wavy shape similar to that of the organic layer pattern 140.

Figure 19:
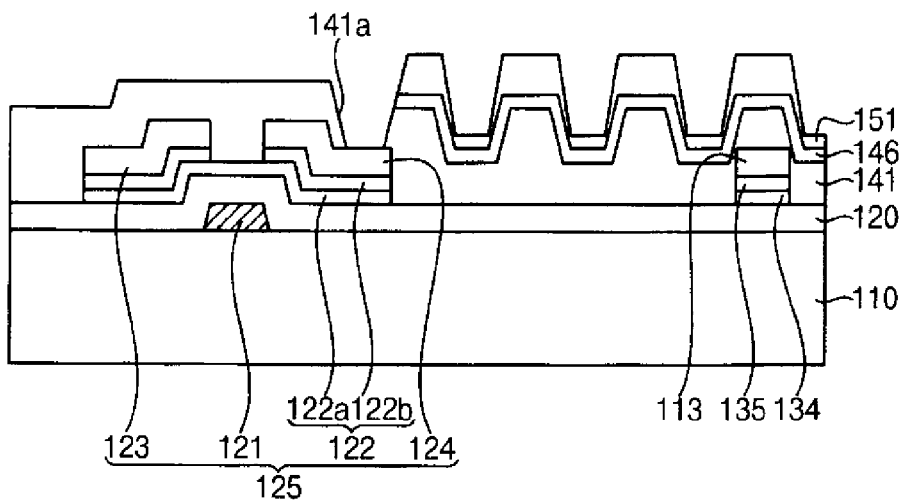

In other embodiments, as illustrated in FIG. 19, a dielectric layer 151 may be uniformly located on the organic layer pattern 141, so that the a dielectric layer 151 may have a substantially toothed shape when the organic layer pattern 141 has a substantially toothed shape.

Hereinafter, processes for forming members or structures on the dielectric layer 150 or 151 will be simultaneously described.

Figure 20:
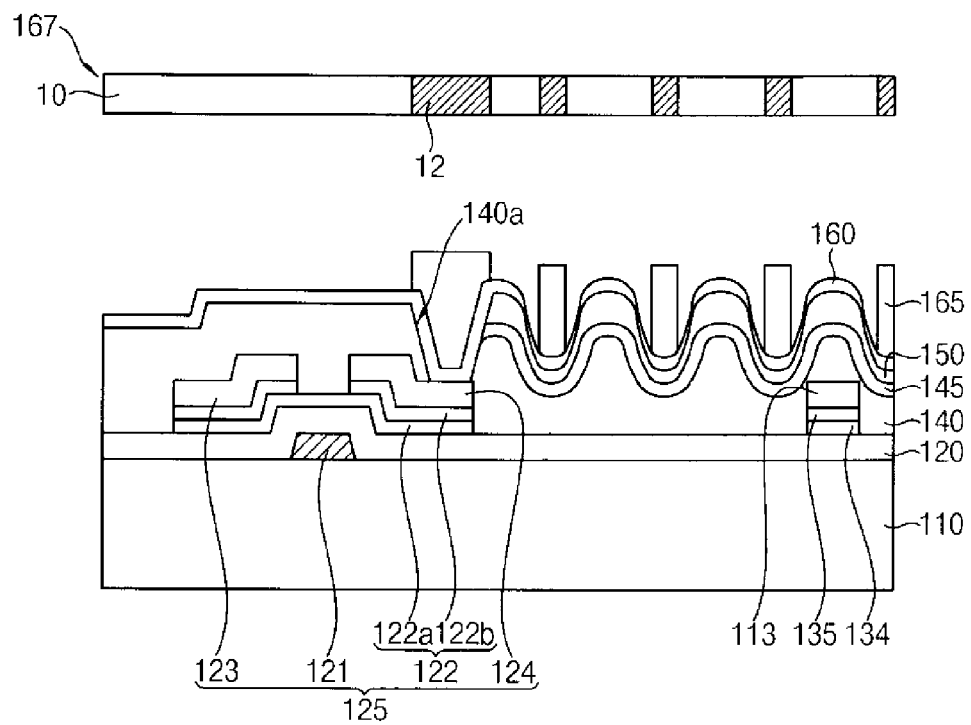
Figure 21:
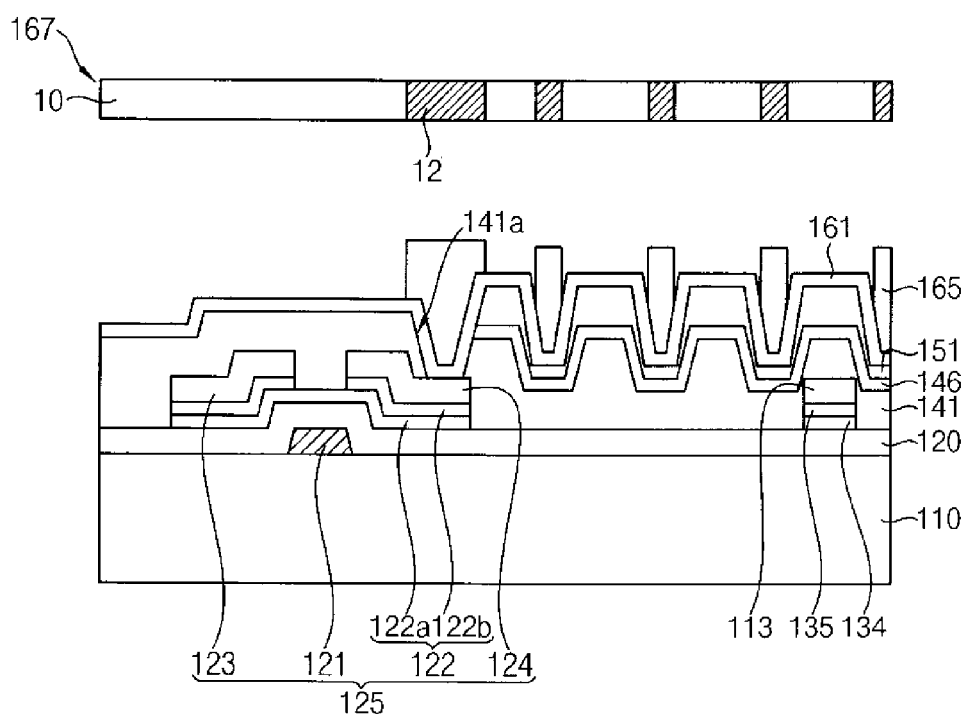

Referring to FIGS. 20 and 21, second transparent electrode layers 160 and 161 may be formed on the dielectric layers 150 and 151 and on insides of the contact holes 140a and 141a in the device region, respectively. A photoresist pattern 165 may be formed on each of the second transparent electrode layers 160 and 161, respectively.

In some embodiments, each of the second transparent electrode layers 160 and 161 may be formed using a transparent conductive material such as indium tin oxide, indium zinc oxide, zinc oxide, zinc tin oxide, tin oxide, indium oxide, and the like. Each of the second transparent electrode layers 160 and 161 may be obtained by a sputtering process, a CVD process, a printing process, and the like. Photoresist films (not illustrated) may be formed on the second transparent electrode layers 160 and 161, respectively, and then the photoresist films may be exposed to light using a mask 167 having a transparent region 10 and a blocking region 12. Exposed portions of the photoresist films may be removed by a developing process to form the photoresist pattern 165 on the dielectric layers 150 and 151. In some embodiments, the mask 167 may include a plurality of the blocking regions 12 and portions of the photoresist films disposed under the blocking regions 12 may remain after the developing process, so that the photoresist pattern 165 may be provided on the second transparent electrode layers 160 and 161, respectively.

Figure 22:
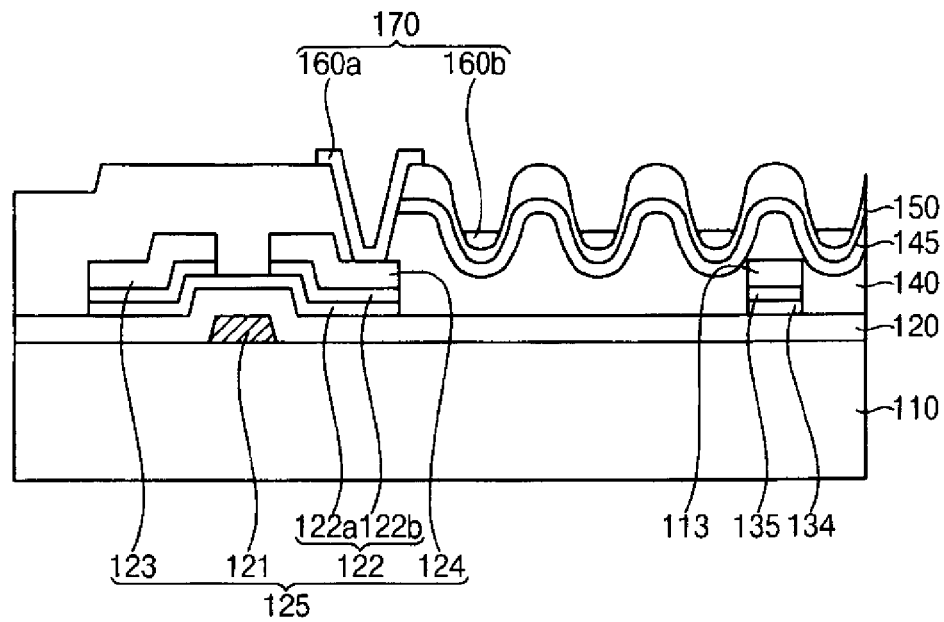
Figure 23:
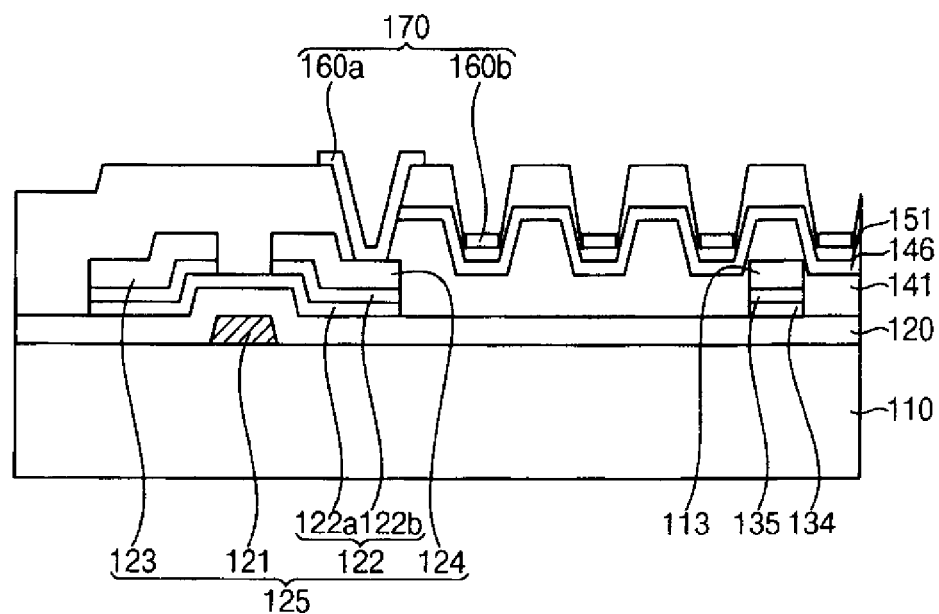

Referring to FIGS. 22 and 23, the second transparent electrode layers 160 and 161 may be partially removed using the photoresist pattern 165 as an etching mask to form a second pixel electrode 170 on the dielectric layers 150 and 151, respectively. After forming the second pixel electrode 170, the photoresist pattern 165 may be removed by an ashing process and/or a strip process.

In some embodiments, the second pixel electrode 170 may include first sub-electrode 160a formed on the contact holes 140a and 141a to be connected with the drain electrodes 124. The second pixel electrode 170 may further include second sub-electrode 160b substantially facing the first pixel electrodes 145 and 146 in the pixel region. As illustrated in FIGS. 22 and 23, the second sub-electrodes 160a may be formed in troughs (i.e., recesses, grooves or dents) of the dielectric layers 150 and 151 that have the substantially wavy shape or the substantially toothed shape. Accordingly, fringe fields may be generated between the second sub-electrodes 160b of the second pixel electrodes 170 and the first pixel electrodes 145 and 146 along a direction substantially parallel to, or substantially horizontal to the lower substrate 110, so that a non-uniform vertical field generated between the adjacent second pixel electrodes 170 may be minimized.

In some embodiments, as above-described with reference to FIGS. 8 and 9, the second sub-electrodes 160b of the second pixel electrodes 170 may have upper faces substantially lower than uppermost faces of the first pixel electrodes 145 and 146, respectively.

Although not illustrated, a sealant may be located at peripheral portions of the lower substrate 110, and then an upper substrate facing the first and the second electrodes 145, 146 and 170 may be combined with the lower substrate 110. Liquid molecules may be injected into a space between the lower substrate 110 and the upper substrate before or after combining the upper substrate with the lower substrate 110. Additionally, a black matrix corresponding to the switching device 125 and color filters for filtering predetermined color lights may be disposed on the upper substrate and/or the lower substrate 110.

In some embodiments, an order of the processes of manufacturing the display device may be modified. An organic layer pattern, a first pixel electrode and a dielectric layer may have structures other than the substantially wavy structure or the substantially toothed structure as described above. In some embodiments, the organic layer pattern, the first pixel electrode and the dielectric layer may have other structures in which a horizontal field may be enhanced whereas a vertical field between adjacent pixel electrodes may be cancelled.

FIGS. 24 to 31 are cross-sectional views illustrating an embodiment of a method of manufacturing a display device. In the method illustrated in FIGS. 24 to 31, detailed descriptions of processes substantially the same as or similar to those illustrated with reference to FIGS. 10 to 23 may be omitted.

Figure 24:
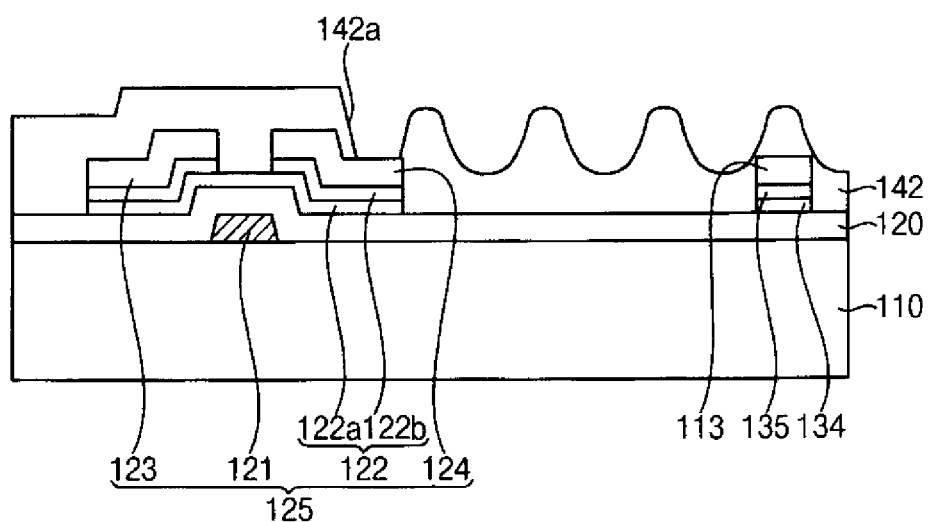

Referring to FIG. 24, a gate insulation layer 120, a switching device 125 and a data line 113 may be formed on a lower substrate 110 by performing processes substantially the same as or substantially similar to those described with reference to FIGS. 10 to 14. An organic layer pattern 142 may be formed on the gate insulation layer 120 to cover the data line 113.

As illustrated in FIG. 24, the organic layer pattern 142 in the pixel region may have a substantially wavy structure that includes substantially rounded recesses, substantially rounded grooves or substantially rounded dents. A contact hole 142a partially exposing the drain electrode 124 may be formed together with the organic layer pattern 142 in the device region.

Figure 25:
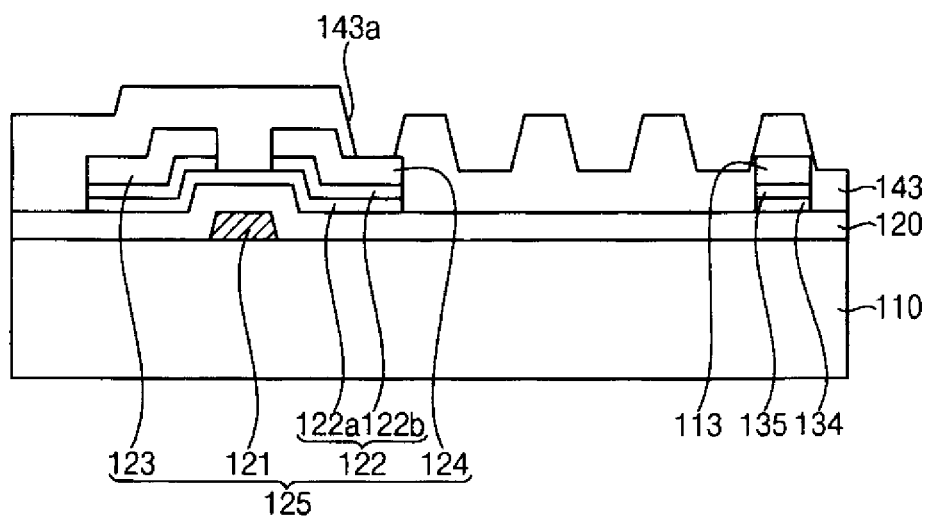

In some other embodiments, as illustrated in FIG. 25, an organic layer pattern 143 in the pixel region may have a substantially toothed shape. Additionally, a contact hole 143a partially exposing the drain electrode 124 may be formed together with the organic layer pattern 143 in the device region.

Figure 26:
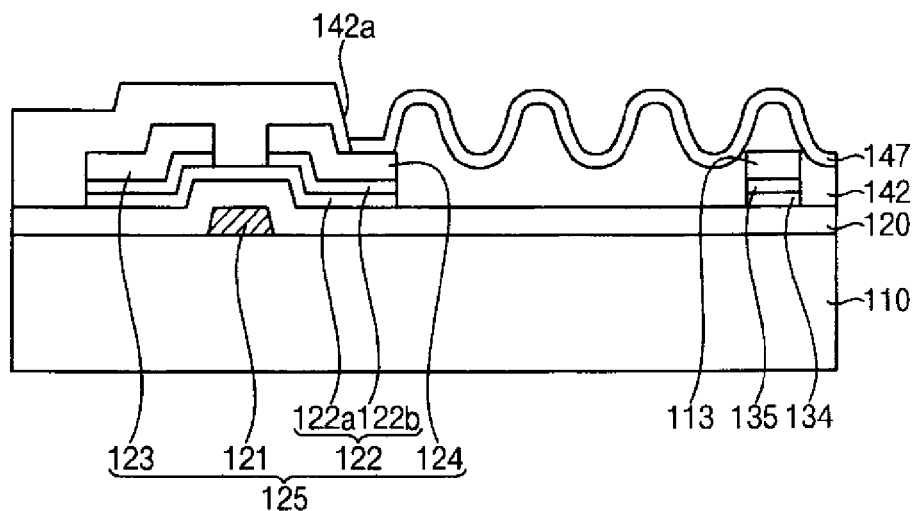

Referring to FIG. 26, a first pixel electrode 147 may be formed on the organic layer pattern 142 in the pixel region and on a bottom of the contact hole 142a. The first pixel electrode 147 may make contact with the drain electrode 124. In some embodiments, a first transparent electrode layer (not illustrated) may be formed on the organic layer pattern 142 and an inside of the contact hole 142a. The first transparent electrode layer may be partially removed by a photolithography process, so that the first pixel electrode 147 may be formed on the organic layer pattern 142. The first pixel electrode 147 may have a substantially wavy structure including substantially rounded recesses, substantially rounded grooves or substantially rounded dents, similar to the structure of the organic layer pattern 142.

Figure 27:
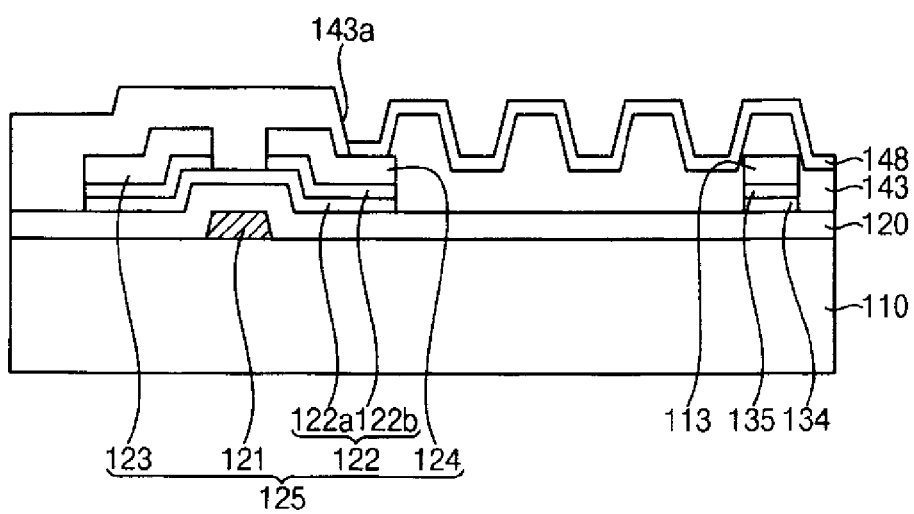

In other embodiments, as illustrated in FIG. 27, when the organic layer pattern 143 has a substantially toothed shape, a first pixel electrode 148 may also have a substantially toothed shape. The first pixel electrode 148 may make contact with the drain electrode 124 on the bottom of the contact hole 143a.

Figure 28:
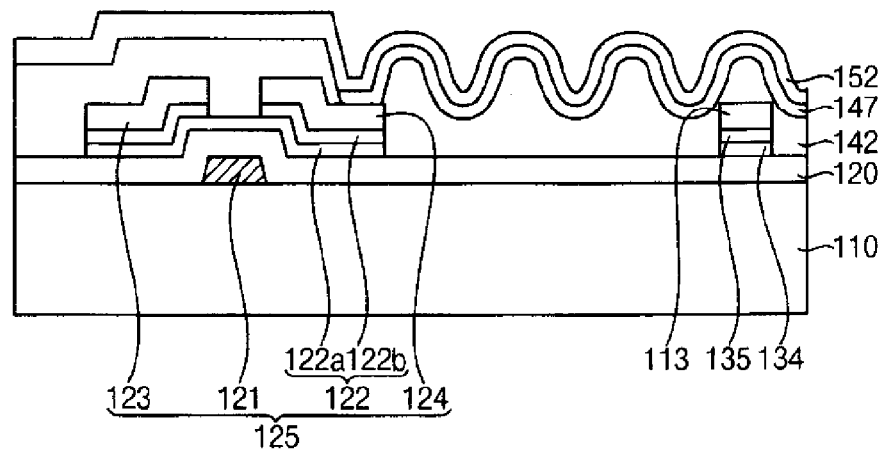

Referring to FIG. 28, a dielectric layer 152 may be formed on the organic layer pattern 142 and the first pixel electrode 147. The dielectric layer 152 may be formed along a profile of the first pixel electrode 147 in the pixel region, so that the dielectric layer 152 may have a substantially wavy structure.

Figure 29:
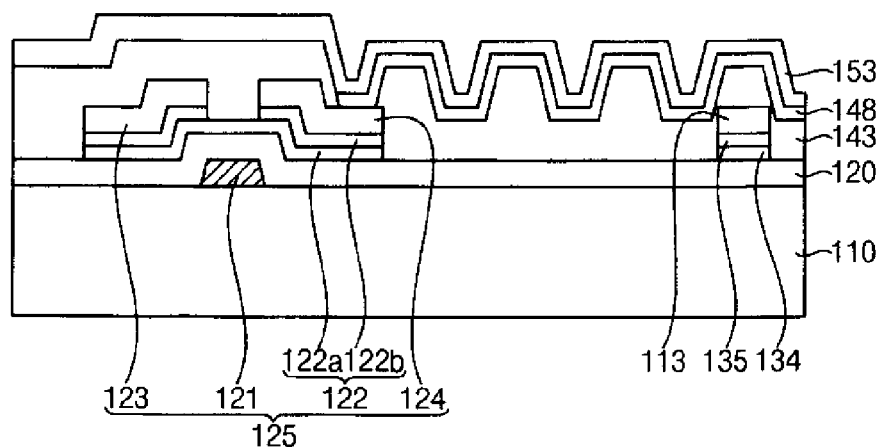

In other embodiments, as illustrated in FIG. 29, when the organic layer pattern 143 has a substantially toothed shape, the dielectric layer 153 may also have a substantially toothed shape on the first pixel electrode 148.

Figure 30:
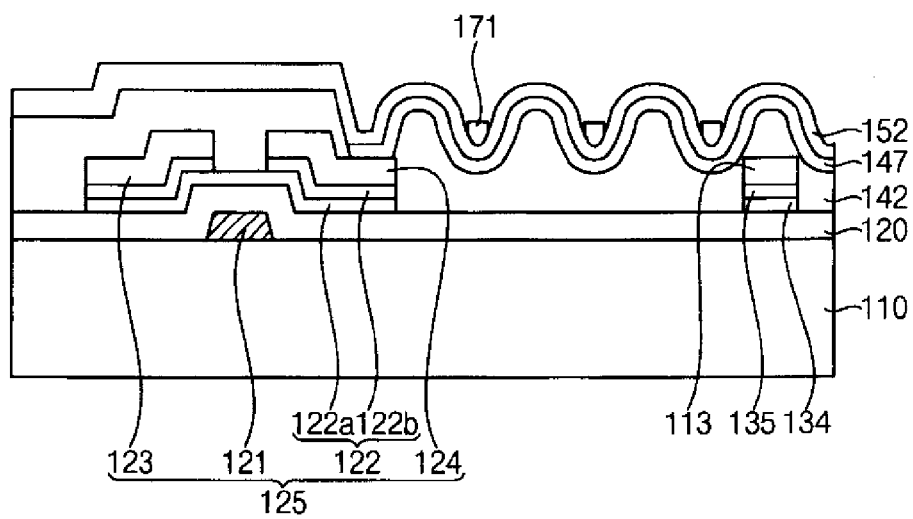
Figure 31:
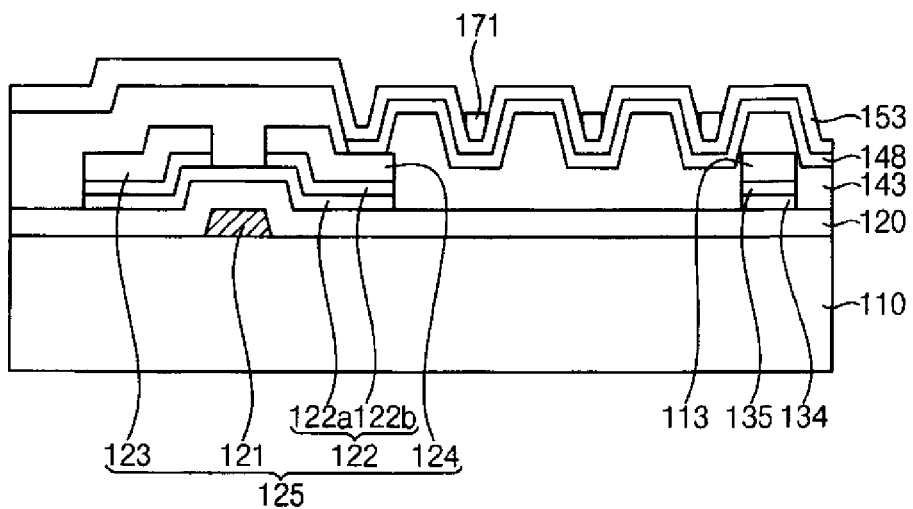

Referring to FIGS. 30 and 31, a second pixel electrode 171 may be formed on each of the dielectric layers 152 and 153 by performing processes substantially the same as or substantially similar to those described with reference to FIGS. 20 to 23. In some embodiments, the second pixel electrode 171 may be formed in troughs (i.e., recesses, grooves or dents) of the dielectric layers 152 and 153. Accordingly, fringe fields may be generated between the second pixel electrode 171 and one of the first pixel electrodes 147 and 148 in a direction substantially parallel or substantially horizontal to the lower substrate 110, so that non-uniform vertical fields generated between adjacent second pixel electrodes 171 may be minimized.

In some embodiments, the second pixel electrode 171 may have an upper face substantially lower than the uppermost upper faces of the first pixel electrodes 147 and 148 by adjusting heights or depths of stepped portions of the organic layer patterns 142 and 143.

Although not illustrated, a sealant may be located at peripheral portions of the lower substrate 110, and an upper substrate facing the first and the second electrodes 147, 148 and 171 may be combined with the lower substrate 110. Liquid molecules may be injected into a space between the lower substrate 110 and the upper substrate. Additionally, a black matrix corresponding to the switching device 125 and color filters for filtering predetermined color lights may be disposed on the upper substrate and/or the lower substrate 110.

Figure 32:
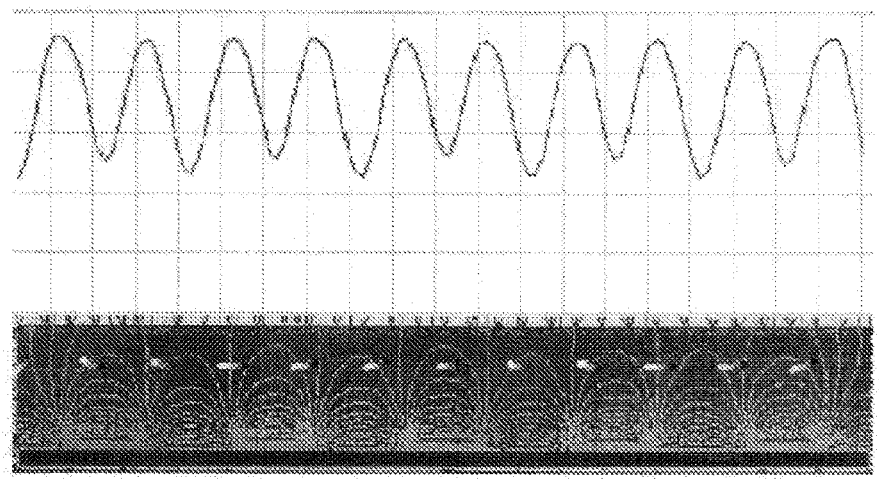
Figure 33:
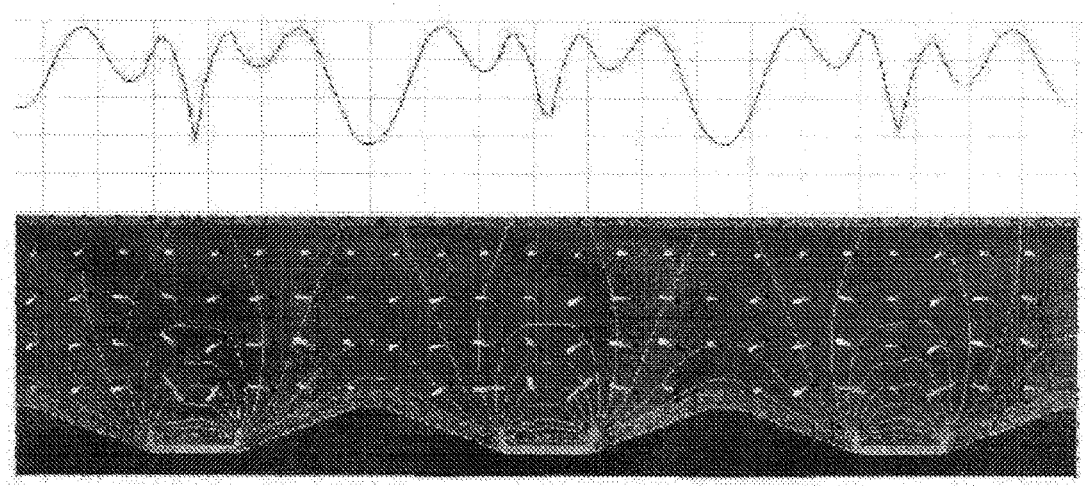
Figure 34:
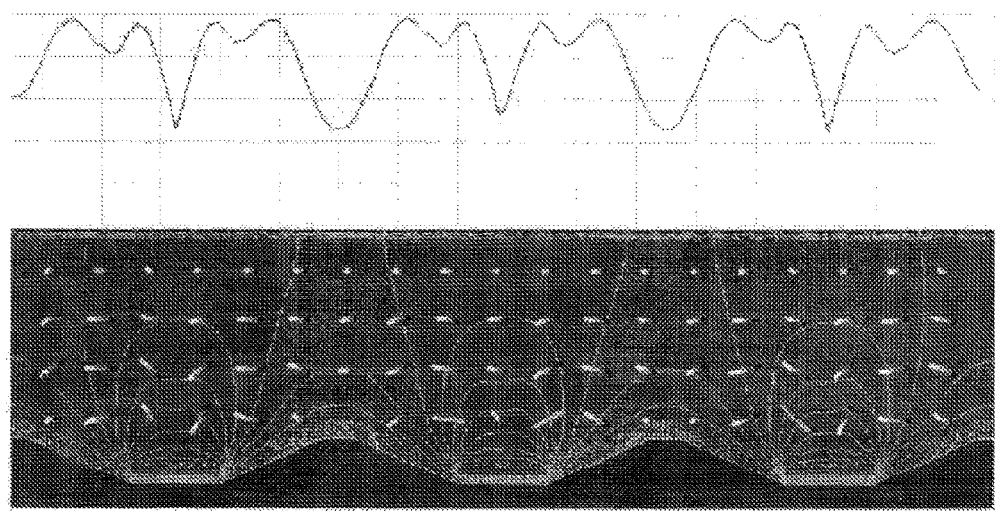
Figure 35:
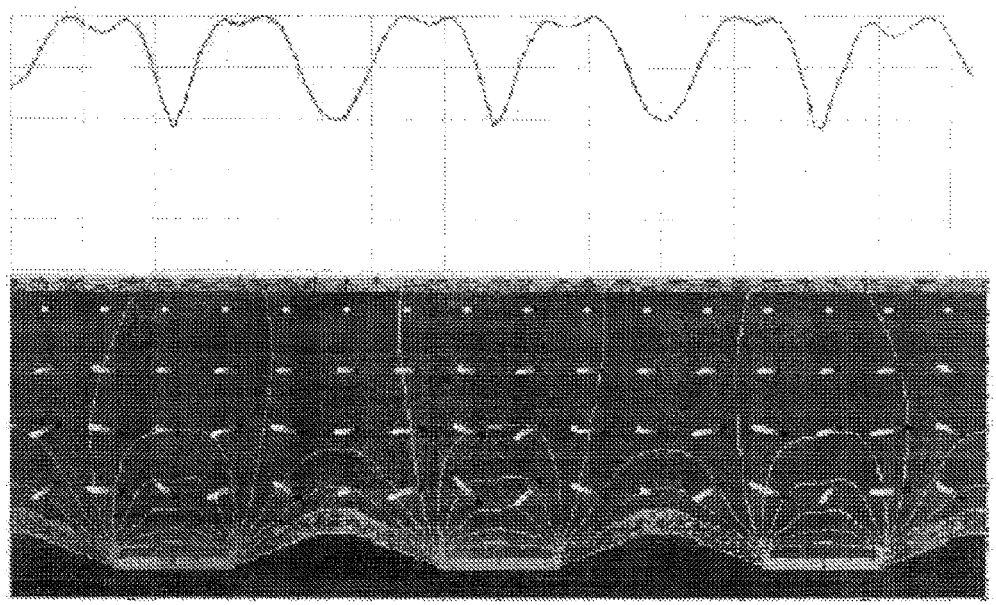

FIG. 32 is a graph showing a field generated between a pixel electrode and a common electrode of a conventional LCD device operating in a PLS mode. FIGS. 33 to 35 are graphs showing fields generated between first and second pixel electrodes of the embodiments of the display devices.

As shown in FIG. 32, in the conventional LCD device, a relatively strong vertical field is observed between parallel pixel and common electrodes. As shown in FIGS. 33 to 35, vertical fields between adjacent pixel electrodes are drastically reduced and horizontal fields are relatively enhanced in the embodiments of display devices. As the distances between the first and second pixel electrodes in the display devices are decreased, the horizontal field are strengthened.

Figure 36:
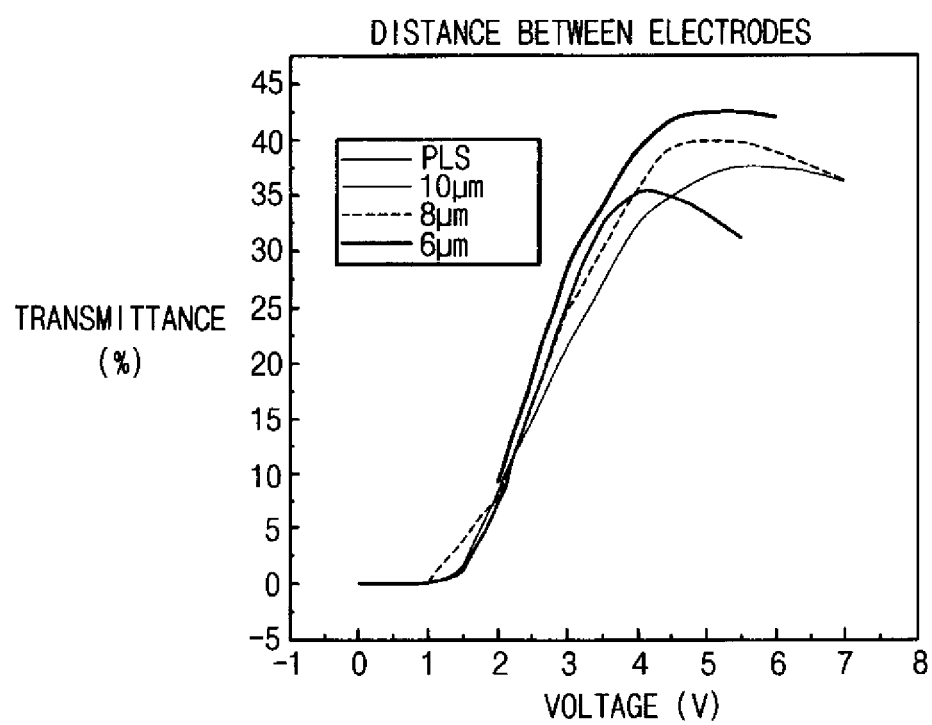

FIG. 36 is a graph showing light transmittances of embodiments of display devices illustrated in FIGS. 32 to 35.

As shown in FIG. 36, when a voltage is increased to above about 4V, the display devices described with reference to FIGS. 33 to 35 have light transmittances substantially higher than that of the conventional display device illustrated in FIG. 32 operating in a PLS mode.

According to various embodiments, a display device may be used as a liquid crystal display device utilizing a fringe field. The display device may include pixel electrodes having morphology of a substantially wavy structure or a substantially toothed structure, so that non-uniform vertical fields between the adjacent pixel electrodes may be minimized. Therefore, the display device may ensure an improved brightness distribution and an enhanced transmittance.

Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific example embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. A display device comprising:
    a switching device on a lower substrate;
    an organic layer pattern on the lower substrate, the organic layer pattern comprising a plurality of stepped portions in a pixel region;
    a first pixel electrode on the organic layer pattern in the pixel region;
    a dielectric layer on the first pixel electrode, wherein the dielectric layer includes a plurality of recesses, grooves or dents; and
    a plurality of second pixel electrodes on the dielectric layer, the second pixel electrodes being partially superimposed over the first pixel electrode, wherein each of the second pixel electrodes is disposed in each of the recesses, grooves, or dents of the dielectric layer and wherein each of the second pixel electrodes has an upper face lower than an uppermost face of the first pixel electrode.

2. The display device of claim 1, wherein the organic layer pattern has a wavy structure or a toothed structure in the pixel region.

3. The display device of claim 2, wherein the organic layer pattern includes a plurality of recesses, grooves or dents in the pixel region.

4. The display device of claim 3, wherein each of the recesses, the grooves or the dents includes a rounded sidewall or an inclined sidewall.

5. The display device of claim 3, wherein the first pixel electrode includes a plurality of recesses, grooves or dents, respectively.

6. The display device of claim 1, wherein each of the second pixel electrodes includes a first sub-electrode and second sub-electrode, and wherein the first sub-electrode is electrically connected to the switching device and the second sub-electrode is partially superimposed over the first pixel electrode.

7. The display device of claim 6, wherein the first sub-electrode makes contact with the switching device through a contact hole penetrating the dielectric layer and the organic layer pattern.

8. The display device of claim 1, wherein the first pixel electrode is electrically connected to the switching device.

9. The display device of claim 1, wherein the switching device includes a gate electrode, a gate insulation layer, an active layer, a source electrode and a drain electrode disposed on the lower substrate.

10. The display device of claim 1, further comprising:
    a liquid crystal layer on the second pixel electrodes; and
    an upper substrate on the liquid crystal layer, the upper substrate facing the lower substrate.

11. The display device of claim 1, wherein the lower substrate includes a data line and the first pixel electrode is superimposed over the data line.

12. The display device of claim 1, wherein a horizontal field relative to the lower substrate is generated between the first pixel electrode and the second pixel electrode adjacent to the first pixel electrode.

* * * * *